United States Patent Office 3,827,998
Patented Aug. 6, 1974

3,827,998
ANISOTROPIC DOPES OF POLYAMIDES IN CONCENTRATED SULFURIC ACID
Paul Winthrop Morgan, West Chester, Pa., assignor to E. I. du Pont de Nemours and Company, Wilmington, Del.
No Drawing. Filed Oct. 27, 1972, Ser. No 301,291
Int. Cl. C08g 51/46
U.S. Cl. 260—30.8 R                 4 Claims

ABSTRACT OF THE DISCLOSURE

Novel fiber-forming polyamides consisting essentially of repeating units of the formula:

—HN—R$_1$—NHCO—R$_2$—CO— wherein R$_1$ represents a divalent radical selected from the group of 1,4-phenylene; chloro-1,4-phenylene; and *trans*-1,4-cyclohexylene; and R$_2$ represents a divalent radical selected from the group of chloro-1,4-phenylene; *trans*-1,4-cyclohexylene; and *trans*-1,4-dimethyl - 1,4 - cyclohexylene, with the proviso that when R$_1$ is *trans*-1,4-cyclohexyl, R$_2$ is chloro-1,4-phenylene, and that when R$_1$ is 1,4-phenylene or chloro-1,4-phenylene, R$_2$ is *trans*-1,4-cyclohexylene or *trans* - 1,4 - dimethyl-1,4-cyclohexylene and anisotropic spinning dopes thereof.

---

This invention relates to novel, high molecular weight linear polyamides together with anisotropic spinning dopes of these polyamides.

BACKGROUND OF THE INVENTION

The preparation of polyamides whose repeating structural units are characterized by enchained 1,4-cyclohexylene radicals is described by Kalmykova et al. in "Polymer Science (U.S.S.R.)" (English Translation) 9 (12) 2872–2876 (1967) and in "Polymer Science (U.S.S.R.)" (English Translation) 8 (9) 1748–1753 (1966). Fiber-forming copolyamides whose repeating structural units are characterized by enchained 1,4-cyclohexylene radicals are described by Caldwell and Gilkey in U.S. 2,916,475 and U.S. 2,934,862. Ufer U.S. 2,733,230 discloses film-forming polyamides prepared from 1,4-diaminocyclohexanes. Anisotropic spinning dopes are taught in Kwolek U.S. 3,671,542.

SUMMARY OF THE INVENTION

This invention provides novel fiber-forming polyamides consisting essentially of repeating units of the formula:

(I)        —HN—R$_1$—NHCO—R$_2$—CO— wherein R$_1$ represents a divalent radical selected from the group of 1,4-phenylene; chloro-1,4-phenylene; and *trans*-1,4-cyclohexylene; and R$_2$ represents a divalent radical selected from the group of chloro-1,4-phenylene; *trans*-1,4-cyclohexylene; and *trans*-1,4-dimethyl-1,4-cyclohexylene, with the proviso that when R$_1$ is *trans*-1,4-cyclohexylene, R$_2$ is chloro-1,4-phenylene, and that when R$_1$ is 1,4-phenylene or chloro-1,4-phenylene, R$_2$ is *trans*-1,4-cyclohexylene or *trans*-1,4-dimethyl-1,4-cyclohexylene.

Useful formula (I) polyamides exhibit inherent viscosity values of at least about 1.0, preferably 2.0 or higher, measured as described hereinafter.

Preferably, formula (I) polyamides are prepared by the reaction between diamines of the formula:

(II–A)              H$_2$N—R$_1$—NH$_2$ and diacid chlorine of the formula (II–B)

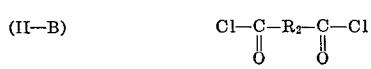

wherein R$_1$ and R$_2$ have the significance set forth hereinbefore.

This invention also provides novel, optically anisotropic dopes which are prepared from formula (I) polyamides and concentrated sulfuric acid within the concentration range of about 99–105% H$_2$SO$_4$, preferably about 99–102%.

DESCRIPTION OF THE PREFERRED EMBODIMENTS

Useful Polyamides

The polyamides useful in this invention may be prepared by solution polymerization processes similar to those described in, e.g., Kwolek U.S. 3,063,966. In this process, a cooled (e.g., with ice, ice-water, solid carbon dioxide) stirred solution of a formula (II–A) diamine is formed in a basic solvent system, e.g., mixture of hexamethylphosphoramide (HMPA) and N - methylpyrrolidone-2 (NMP). Other useful media are HMPA alone, N,N-dimethylacetamide (DMAc), N,N,N',N'-tetramethylurea (TMU), and mixtures thereof. A suitable formula (II–B) comonomer is then added rapidly to the diamine solution. The reaction mixture may be stirred and/or allowed to stand until the desired degree of polymerization has been achieved. Frequently, the reaction mixture becomes a difficulty stirrable mass within a relatively short period of time after addition of the acid chlorides. For some combinations of intermediates the addition of anhydrous lithium chloride or calcium chloride to the amide medium, or the generation of such salts during or near the end of the polymerization by addition of appropriate bases, is beneficial in increasing the molecular weight of the product. It is convenient to obtain the polymeric product by combining the reaction mixture, e.g., as a viscous solution or solid mass, with a polymer nonsolvent, e.g., water, after which the polymer is collected by filtration, washed (e.g., with water, acetone, alcohol), and dried prior to being dissolved to form the dopes of this invention. During polymerization, the acidic hydrogen chloride by-product generated by the condensation reaction may be neutralized by adding to the reaction mixture a suitable neutralizing agent, e.g., lithium carbonate.

The useful polyamides may also be prepared by conventional interfacial polymerization techniques. For example, to a stirred combination of water, the diamine, an inorganic base (e.g., sodium carbonate), and a water immiscible liquid is added the diacid chloride dissolved in the same water-immiscible liquid. After the reaction has been completed, the contents of the reaction vessel are combined with a polymer nonsolvent. The precipitated polymer is collected, washed, and dried, as shown above. Alternatively, selected water-miscible or partially water-miscible solvents, e.g., tetrahydrofuran or cyclohexanone, may be used in an interfacial system.

Formula (II–A) diamines useful for preparing the polyamides, dopes, and fibers of this invention include 1,4-phenylenediamine; chloro - 1,4 - phenylenediamine; and *trans*-1,4-cyclohexanediamine. Formula (II–B) diacid chlorides useful in this invention are *trans*-1,4-cyclohexanedicarbonyl chloride, chloroterephthaloyl chloride, and *trans*-1,4-dimethyl-1,4-cyclohexanedicarbonyl chloride.

The preferred formula (I) polyamide is poly(chloro-1,4 - phenylene - *trans*-1,4 - cyclohexanedicarboxamide). Other useful polymers include poly(1,4-phenylene-*trans*-1,4 - cyclohexanedicarboxamide), poly(*trans*-1,4 - cyclohexylene chloroterephthalamide), and poly(1,4 - phenylene-*trans*-1,4-dimethyl - 1,4-cyclohexanedicarboxamide).

In preparation of the polyamides useful in this invention, chain terminators may be used. Among suitable chain terminators are compounds which can react monofunctionally with the acid chloride ends of these polymers, such as ammonia, ethylamine, dimethylamine, diethylamine, aniline, etc. Other terminators include hydroxylic compounds such as methyl alcohol, ethyl alcohol, isopropyl alcohol, and phenol. Useful terminators which react monofunctionally with the amine ends of these polymer chains include acid chlorides, e.g., acetyl chloride, acid anhydrides, e.g., acetic anhydride, and isocyanates, e.g., phenyl isocyanate.

Useful Solvents

The preferred solvent for preparing the anisotropic dopes of this invention is concentrated sulfuric acid within the concentration range of about 99–105%, preferably 99–102%.

Dope Preparation

The anisotropic dopes of this invention are prepared by first combining under anhydrous conditions and with stirring and mixing, suitable quantities of the appropriate formula (I) polyamide with the sulfuric acid to form compositions containing from about 10–20% by weight polyamide, preferably about 14–15% by weight. Generally, during addition of the polyamide, the heat of mixing should be controlled in order that the temperature of the combined ingredients does not exceed 60° C., preferably not over 40° C. This may be accomplished by using cooled quantities of acid, application of external cooling baths to the mixing vessel, controlled rate of addition of the solid polymeric material, appropriate stirring action, and/or combinations of those procedures. However, in some instances, it may be desirable to mix the ingredients with a moderate degree of heating in order to achieve more rapid dissolution of the polymeric solid. During preparation of the dope and the spinning thereof, the dopes should be maintained at temperatures which reduce the opportunity for polymer degradation to occur.

Since excessive water can interfere with the formation of dopes suitable for spinning and can contribute to degradation of the polymer, dopes should be prepared with relatively dry polymer samples under conditions where exposure to atmospheric moisture is minimized, e.g, under a blanket of dry nitrogen.

Some dopes of this invention are solid at room temperature and must be heated, as well as stirred or otherwise mixed, to attain sufficient fluidity prior to being shaped, e.g., into fibers. As the temperature of these solid dopes is raised, melting occurs, the dopes become less viscous, and may become translucent to transparent. For a well-mixed dope of given composition and concentraton, the temperature at which melting occurs is fairly reproducible and reversible. This melting behavior is accompanied by an absorption of heat as indicated by differential thermal analysis. The melting temperature of the solidified dope can also be determined by measuring the intensity of polarized light passing through a thin sample and a 90° crossed analyzer as the temperature is raised. The melting temperature is that temperature at which the transmitted light intensity increases rapidly. In general, the melting temperature increases as the solids concentration increases.

For the preparation of fluid, shapable dopes from these solid dopes, it is preferred that the solid dope be heated only slightly above its melting point, e.g., up to about 10° C. higher than the melting point. After being initially prepared, the dopes of this invention, including those obtained by heating the above-described solid dopes are very viscous. Processing them into shaped articles, e.g., the spinning fibers, is facilitated by increasing their fluidity by means of adequate stirring or other shearing action.

Anisotropic Character of the Dopes

The dopes of this invention are optically anisotropic, i.e., microscopic regions of a given dope are birefringent; a bulk dope sample depolarizes plane-polarized light because the light transmisson properties of the microscopic areas of the dope vary with direction. This characteristic is associated with the existence of at least part of the dopes in the liquid crystalline or mesomorphic state. The liquid crystalline state of the dopes of this invention is of the nematic type.

The dopes of this invention which exhibit optical anisotropy do so while the dopes are in the relaxed state. This is in contrast to conventional polymer solutions which may be caused to depolarize plane-polarized light when subjected to appreciable shear.

There is a complex relationship existing among, e.g., the concentration of the particular polymer or copolymer species, the inherent viscosity thereof, the solvent system, and the dope temperature which gnerally determines the ranges in which a given dope is anisotropic or isotropic. A useful polymer concentration-dope viscosity relationship exists for given polymer-solvent combinations which are capable of forming the anisotropic dopes of this invention. For such combinations, the dope formed is isotropic when the polymer concentration is below a particular level. As the concentration of the polymer is increased, the viscosity of the dope increases. However, at a point identified herein as the "critical concentration point" there is a sharp discontinuity in the slope of the viscosity v. concentration curve when the dope changes from isotropic to partially anisotropic without the formation of a solid phase. Further addition of polymer results in a decrease in the viscosity v. concentration curves of this type as shown in Bair & Morgan U.S. 3,673,143 and Kwolek U.S. 3,671,542. The "critical concentration point" (as well as the complete viscosity v. concentration curve) is routinely determined using conventional concentration and viscosity measuring techniques. For example, a polymer dope of this invention may be placed in a suitable vessel equipped with a Teflon® TFE-fluorocarbon cap through which a viscometer spindle extends (without contacting the cap) into the dope, with constant temperature being maintained. The viscosity may be conventionally measured with a viscometer (e.g., a Brookfield Synchro-Lectric Viscometer, Model RV, product of the Brookfield Engineering Laboratories, Inc., Stoughton, Mass., or equivalent). Viscosity measurements are made at the initial polymer concentration and at higher concentrations (i.e., after an additional known amount of polymer is added). By this technique (or equivalent) a viscosity v. concentration curve may be plotted for this system (the given polymer and liquid medium at that temperature) and the critical concentration point (i.e., the discontinuity in the slope of the curve) is determined.

A qualitative determination of optical anisotropy in the dopes of this invention can be conveniently made using a light source, analyzer, and crossed polarizer (or equivalents thereof). Commercially available polarizing microscopes may be useful for the qualitative determination of optical anisotropy for the dopes of this invention, as may pieces of Polaroid® film.

Another qualitative determination of the anisotropic character of these dopes may be made with the naked eye. These dopes may appear turbid or hazy and yet contain no, or practically no undissolved solid. When the dope, seen under reflected ordinary light, is disturbed by shaking or rolling the vessel containing the dope or by only slow stirring, there is produced a characteristic, readily observed, satin-like sheen or glow which is observed even after the disturbance ceases, and which decreases in intensity thereafter. This may be described as being a pearly or opalescent quality of the dope. Dopes which are disturbed as described above often given the appearance of having striations and/or graininess in the surface. These visual effects are observed in the anisotropic dopes of this invention. This may commonly be referred to as "stir opalescence". Further details on qualitative and quantitative determinations of optical anisotropy are presented in Kwolek U.S. 3,671,542. The latter patent describes the improved properties (e.g., higher tenacity and initial modulus) of fibers spun from anisotropic, rather than isotropic systems.

Fiber Preparation

The dopes of this invention may be formed into fibers of high quality by spinning them into suitable baths.

The dopes of this invention may be spun into fibers by wet spinning techniques, using spinnerets and other apparatus constructed of materials resistant to the strong acids used. The baths may be, e.g., water, as shown in the examples, or a dilute solution of sulfuric acid. Preferably, the temperature of a coagulation bath is room temperature or below, although higher temperature baths may be used.

It is desirable to completely remove the spinning solvent from fiber samples prepared from the dopes of this invention. Water alone or aqeous alkaline solutions may be used for removal of the residual acid. A convenient method is to spray the threadline as it leaves the coagulating bath with an aqueous alkaline solution (e.g., saturated sodium bicarbonate) remove the surface liquid from the threadline with a wiping device (e.g., a sponge) or a jet, wash with water to reduce the acid content, and wind up the fibers on bobbins. The fibers may be soaked in water for a period sufficient to remove the acid. The thoroughly washed fibers may be dried on the bobbin in air at temperatures of up to about 110° C. They can also be conveniently dried on heated rolls.

It will be understood that the usual additives such as dyes, fillers, antioxidants, etc., can be incorporated into the dopes of this invention for the purpose intended, prior to shaped article preparation.

The fibers prepared from the acidic dopes of this invention exhibit high values of tensile properties, especially in the as-extruded state, i.e., without subsequent hot drawing or annealing. The tensile properties of the fibers prepared from the dopes of this invention can be improved by hot drawing operations.

The as-extruded fibers of this invention, spun from the anisotropic dopes of formula (I) polyamides, exhibit tenacity and initial modulus values (measured as described hereinafter) of at least 2.5 g.p.d. and 60 g.p.d., respectively. These as-extruded fibers exhibit orientation angles of less than about 45°.

The tensile properties of these as-extruded fibers can be enhanced by subjecting the undrawn fibers to a heat treatment.

The excellent properties of the fibers of this invention are particularly useful as reinforcing agents for plastic laminates, tire cords, V-belts, and the like. Furthermore, the fibers of this invention are essentially colorless, making them useful in general textile application.

MEASUREMENTS AND TESTS

Inherent viscosity: Inherent viscosity ($\eta_{inh}$) is defined by the following equation:

$$\eta_{inh} = \frac{\ln(\eta_{rel})}{C}$$

wherein ($\eta_{rel}$) represents the relative viscosity and C represents a concentration of 0.5 gram of the polymer in 100 ml. of solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C), above; flow times are determined at 30° C.; the solvent is sulfuric acid (96–98% sulfuric).

Fiber tensile properties: Filament properties are measured on fibers that have been conditioned at 21° C. and 65% relative humidity (R.H.) for at least 16 hours unless otherwise specified. Yarn properties are measured on yarn that has been conditioned at 24° C. and 55% R.H. for at least 16 hours. All measurements are made in the fiber conditioning environment.

Tenacity (breaking tenacity) (T), elongation (breaking elongation) (E), and initial modulus (Mi) are obtained from breaking a single filament or a multifilament yarn on an Instron tester (Instrom Engineering Corp., Canton, Mass.).

Single filaments are broken with a gage length (distance between jaws) of 1.0 inch (2.54 cm.). The results on 3 filaments are averaged. Yarns are given 3 turns per inch (2.54 cm.) twists (under 0.1 g.p.d. tension) and broken with a 10-inch (25.4 cm.) gage length. All samples are elongated at a constant rate of extension (10% elongation/minute for fibers having an E of under 8%, and 60% elongation/minute for fibers with E of 8 to 100%) until the sample breaks.

The denier of a single filament (d.p.f.) is calculated from its functional resonant frequency, determined by vibrating a 7 to 9 cm. length of fiber under tension with changing frequency. (A.S.T.M. D1577–66, part 25, 1968). This filament is then used for 1 break.

The denier of yarn is determined by weighing a known length (at 0.1 g.p.d. tension); 90 cm. length is convenient.

The tenacity (grams/denier), elongation (percent), and initial modulus (gram/denier) as defined in A.S.T.M. D2101, part 25, 1968 are obtained from the load-elongation curve and the measured denier. In actual practice, the measured denier of the sample, test conditions, and sample identification are fed to a computer before the start of a test, the computer records the load-elongation curve of the fiber as it is broken and then calculates the fiber properties.

It should be noted that different values are obtained from single filaments (filament properties) and from multifilament strands (yarn properties) of the same sample. Unless specified otherwise all properties given herein are filament properties.

Orientation angle: Orientation angle (O.A.) values for the fibers of this invention may be measured by the procedure described in Kwolek U.S. 3,671,542.

EXAMPLE 1

This example illustrates the preparation of poly(1,4-phenylene trans - 1,4 - cyclohexanedicarboxamide); fibers are prepared from an anisotropic dope.

To a stirred solution of 1,4-phenylenediamine (13.56 g., 0.125 mole) in a mixture of HMPA/NMP (210 ml./ 105 ml.) is added trans-1,4-cyclohexanedicarbonylchloride (26.22 g., 0.125 mole), followed by a 10 ml. rinse of NMP. Stirring is continued and the polymer begins to precipitate in 1–2 minutes. After the reaction mixture is permitted to stand for 1 hour, lithium carbonate (9.4 g.) is added. The reaction mixture is then permitted to stand at room temperature for approximately 65 hours, after which it is heated to 65–75° C. for several hours. The reaction mixture is combined with water and the precipitate collected, washed several times with water and twice with acetone, and dried in vacuum oven at 80° C. For the washed and dried polymer, $\eta_{inh}$=2.11.

An anisotropic spinning dope containing 14.3% solids is prepared by combining 30 g. of the above-prepared polyamide with 100 ml. of 100.6% sulfuric acid in a jacketed vessel cooled with running water at about 10° C. This dope is transferred to a stainless steel spinning cell and extruded at about 25° C. through a spinneret [60-hole, each hole of 0.002 inch (0.005 cm.) diameter] into a water bath maintained at 29° C. The emerging fibers are wound up at the rate of 31 ft./min. 9.5 m./ min.). The fibers are soaked in changes of distilled water for five days, then are dried in air. The washed and dried filaments exhibit the following tensile properties: T/E/Mi/Den.: 2.93/7.2/115/3.8; O.A.=35°.

EXAMPLE 2

This example illustrates the preparation of poly(chloro-1,4-phenylene trans - 1,4 - cyclohexanedicarboxamide); fibers are spun from an anisotropic dope.

To a stirred, ice-cooled solution of chloro-1,4-phenylenediamine (14.26 g., 0.1 mole) in a mixture of HMPA/DMAc (200 ml./100 ml.) is added trans-1,4-cyclohexanedicarbonyl chloride (20.91 g., 0.1 mole). Stirring is continued for 0.5 hour, after which the reaction mixture is allowed to stand at room temperature for approximately 65 hours. The reaction mixture is then combined with water to precipitate the polymer which is collected, washed with water and acetone, and dried in a vacuum oven at 80° C. For the washed and dried product, $\eta_{inh}$=3.83.

An anisotropic spinning dope containing 14.4% solids is prepared by combining 27.2 g. of the above-prepared polyamide with 90 ml. of 100.6% sulfuric acid. The polymer is added portionwise to the stirred solvent to form a viscous anisotropic dope. The dope is wet spun as described in Example 1, above, into an aqueous coagulating bath maintained at 8° C. The emerging fibers are wound up at the rate of 17.5 ft./min. (5.3 m./min.). The washed and dried filaments exhibit the following properties: T/E/Mi/Den.: 7.2/6.6/214/2.4; O.A.=34°.

EXAMPLE 3

This example illustrates the preparation of poly(trans-1,4-cyclohexylene chloroterephthalamide) and fibers thereof, spun from an anisotropic dope.

To a stirred combination of trans-1,4-cyclohexanediamine (17.1 g., 0.15 mole), sodium carbonate (35 g.), and 1500 ml. of water in a blender is added a solution of chloroterephthaloyl chloride (35.63 g., 0.15 mole) in 300 ml. of methylene chloride. After the reaction mixture is stirred for 10 minutes, it is filtered to isolate the product which is collected, washed several times with water and twice with acetone, and dried in a vacuum oven at 80° C. The washed and dried product exhibits an inherent viscosity of 1.43.

An anisotropic spinning dope containing 14% solids is prepared by combining at about 10° C., with stirring, 36 g. of the above-prepared polyamide and 120 ml. of 100.6/ sulfuric acid. After the dope is centrifuged, it is wet spun as described in Example 1, above, into an aqueous coagulating bath maintained at 12–14° C. The emerging fibers are wound up at the rate of 10 ft./min. (3.05 m./min.). The fibers are extracted overnight in distilled water and dried in air. The washed and dried filaments exhibit the following tensile properties: T/E/Mi/Den.: 3.9/8.3/131/5.6; O.A.=45°.

EXAMPLE 4

This example illustrates the preparation of poly(1,4-phenylene trans - 1,4 - dimethyl-1,4-cyclohexanedicarboxamide) and fibers thereof, spun from an anisotropic dope.

To a stirred solution of 1,4-phenylenediamine (10.81 g., 0.1 mole) in a mixture of HMPA/NMP/N,N-dimethylaniline (100 ml./100 ml./50 ml.), warmed to 80° C. in an oil bath, is added trans-1,4-dimethyl-1,4-cyclohexanedicarbonyl chloride (23.71 g., 0.1 mole). The reaction mixture is stirred at 80° C. for 6 hours, then cooled to room temperature and permitted to stand overnight. The reaction mixture is combined with water to precipitate the product which is collected, washed with water and with acetone, and dried in a vacuum oven at 80° C.

The washed and dried product exhibits an inherent viscosity of 4.4.

An anisotropic spinning dope containing 10% solids is prepared by combining 25 g. of the above-prepared polyamide with 125 ml. of 100.6% sulfuric acid. This dope is wet spun as described in Example 1, above, into an aqueous coagulating bath maintained at 64° C. The emerging fibers are wound up at the rate of 73 ft./min. (22 m./min.). The fibers are extracted in distilled water over the weekend and dried in air. The washed and dried filaments exhibit the following properties: T//E/Mi/Den.: 2.9/13.4/65/1.6; O.A.=40°.

What is claimed is:

1. A novel fiber-forming polyamide having an inherent viscosity of at least 1.0 and consisting essentially of repeating units of the formula:

—HN—R₁—NHCO—R₂—CO—

wherein R₁ represents a divalent radical selected from the group of 1,4-phenylene; chloro-1,4-phenylene; and trans-1,4-cyclohexylene; and R₂ represents a divalent radical selected from the group of chloro-1,4-phenylene; trans-1,4-cyclohexylene; and trans-1,4-dimethyl-1,4-cyclohexylene, with the proviso that when R₁ is trans-1,4-cyclohexylene, R₂ is chloro-1,4-phenylene, and that when R₁ is 1,4-phenylene or chloro-1,4-phenylene, R₂ is trans-1,4-cyclohexylene or trans-1,4-dimethyl-1,4-cyclohexylene.

2. The polymer of Claim 1 wherein R₁ is 1,4-phenylene and R₂ is trans-1,4-cyclohexylene.

3. The polymer of Claim 1 wherein R₁ is chloro-1,4-phenylene and R₂ is trans-1,4-cyclohexylene.

4. An anisotropic dope consisting essentially of from about 10–20% by weight, in sulfuric acid of a concentration in the range of about 99–105% H₂SO₄, of a fiber-forming polyamide having an inherent viscosity of at least 1.0 and consisting essentially of repeating units of the formula:

—HN—R₁—NHCO—R₂—CO—

wherein R₁ represents a divalent radical selected from the group of 1,4-phenylene; chloro-1,4-phenylene; and trans-1,4-cyclohexylene; and R₂ represents a divalent radical selected from the group of chloro-1,4-phenylene; trans-1,4-cyclohexylene; and trans-1,4-dimethyl-1,4-cyclohexylene, with the proviso that when R₁ is trans-1,4-cyclohexylene, R₂ is chloro-1,4-phenylene, and that when R₁ is 1,4-phenylene or chloro-1,4-phenylene, R₂ is trans-1,4-cyclohexylene or trans-1,4-dimethyl-1,4-cyclohexylene.

References Cited
UNITED STATES PATENTS

| | | | |
|---|---|---|---|
| 3,554,743 | 1/1971 | Maas | 96—1.5 |
| 3,194,794 | 7/1965 | Caldwell | 260—78 |
| 2,916,475 | 12/1959 | Caldwell | 260—78 |
| 3,269,970 | 8/1966 | Epstein | 260—30.8 |
| 3,671,542 | 10/1964 | Kwolek | 260—30.8 |

ALLAN LIEBERMAN, Primary Examiner

R. H. ZAITLEN, Assistant Examiner

U.S. Cl. X.R.

260—78 R, 78 U